(12) United States Patent
Buehler et al.

(10) Patent No.: US 9,751,457 B1
(45) Date of Patent: Sep. 5, 2017

(54) VEHICLE CONTROL SYSTEM

(71) Applicant: EMERGENCY TECHNOLOGY, INC., Hudsonville, MI (US)

(72) Inventors: William S. Buehler, Hudsonville, MI (US); Kevin Carpenter, Hudsonville, MI (US); Kyle Israels, Hudsonville, MI (US); Michael Walma, Hudsonville, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 6 days.

(21) Appl. No.: 15/190,710

(22) Filed: Jun. 23, 2016

Related U.S. Application Data (60) Division of application No. 14/664,134, filed on Mar. 20, 2015, now Pat. No. 9,499,095, which is a continuation-in-part of application No. 14/299,261, filed on Jun. 9, 2014, now Pat. No. 9,283,887.

(60) Provisional application No. 61/832,494, filed on Jun. 7, 2013, provisional application No. 61/968,028, filed on Mar. 20, 2014.

(51) Int. Cl.
| | |
|---|---|
| *B60Q 7/02* | (2006.01) |
| *B60Q 1/52* | (2006.01) |
| *B60Q 1/26* | (2006.01) |
| *B60R 19/44* | (2006.01) |
| *B60Q 1/46* | (2006.01) |
| *B60Q 5/00* | (2006.01) |

(52) U.S. Cl.
CPC ............. *B60Q 1/2611* (2013.01); *B60Q 1/46* (2013.01); *B60Q 5/00* (2013.01); *B60R 19/44* (2013.01)

(58) Field of Classification Search
CPC .. B60Q 1/26; B60Q 1/46; B60Q 1/343; B60Q 1/50; B60Q 1/2611; B60K 35/00; G08B 25/14
USPC ....... 340/472, 435, 438, 468, 479, 463, 464, 340/471, 902
See application file for complete search history.

(56) References Cited

U.S. PATENT DOCUMENTS

| | | | |
|---|---|---|---|
| 5,422,623 A | 6/1995 | Bader et al. | |
| 5,583,479 A * | 12/1996 | Hettich | ................... B60R 25/04 307/10.2 |
| 5,659,289 A | 8/1997 | Zonkoski et al. | |
| 5,703,411 A | 12/1997 | Bella et al. | |
| 5,736,925 A | 4/1998 | Knauff et al. | |
| 6,113,164 A | 9/2000 | Setina | |
| 6,424,269 B1 * | 7/2002 | Pederson | ............. B60Q 1/2611 340/815.45 |
| 7,551,102 B1 | 6/2009 | Carson | |
| 8,204,245 B2 | 6/2012 | Tobin et al. | |
| 8,301,108 B2 * | 10/2012 | Naboulsi | ................ G08B 21/06 340/575 |
| 9,002,313 B2 | 4/2015 | Sink et al. | |

(Continued)

*Primary Examiner* — Hoi Lau
(74) *Attorney, Agent, or Firm* — McGarry Bair PC (57) ABSTRACT

An control system for use in a vehicle includes at least one functional unit adapted to be mounted in the vehicle, each functional unit having an alert device, connector and a remote controller configured to control a desired state of the respective alert device, and a central controller configured to sense a state of the vehicle and generate a desired state of the functional units based at least partially on the sensed state of the vehicle a functional connection between the central controller and the at least one functional unit.

21 Claims, 7 Drawing Sheets

(56) References Cited

U.S. PATENT DOCUMENTS

| | | | |
|---|---|---|---|
| 2002/0030591 A1* | 3/2002 | Paranjpe | B60Q 9/006 340/436 |
| 2002/0084891 A1* | 7/2002 | Mankins | B60Q 1/2611 340/425.5 |
| 2003/0146828 A1* | 8/2003 | Su | B60R 1/025 340/438 |
| 2003/0158635 A1 | 8/2003 | Pillar et al. | |
| 2004/0227639 A1* | 11/2004 | Masui | B60R 25/00 340/692 |
| 2004/0252027 A1* | 12/2004 | Torkkola | G08B 21/06 340/576 |
| 2006/0125616 A1* | 6/2006 | Song | B60Q 1/38 340/463 |
| 2007/0126561 A1* | 6/2007 | Breed | B60K 28/066 340/426.13 |
| 2008/0036582 A1* | 2/2008 | Farley | B60Q 1/2615 340/468 |
| 2008/0238636 A1* | 10/2008 | Birging | B60R 25/1004 340/426.1 |
| 2008/0258890 A1* | 10/2008 | Follmer | B60R 25/102 340/439 |
| 2010/0253499 A1 | 10/2010 | Haab et al. | |
| 2010/0315220 A1* | 12/2010 | Duani | B60Q 1/447 340/453 |
| 2011/0193692 A1* | 8/2011 | Fong | B60R 25/00 340/426.11 |
| 2012/0313750 A1* | 12/2012 | Au | G08C 17/02 340/5.61 |
| 2014/0092249 A1* | 4/2014 | Freiburger | H04N 7/181 348/148 |
| 2014/0300462 A1* | 10/2014 | Russ | B60Q 1/46 340/471 |
| 2014/0300463 A1* | 10/2014 | Russ | B60Q 1/46 340/471 |

* cited by examiner

VEHICLE CONTROL SYSTEM

CROSS-REFERENCE

This application is a divisional of U.S. Ser. No. 14/664,134, filed Mar. 20, 2015, which is a Continuation in part of U.S. application Ser. No. 14/299,261, filed Jun. 9, 2014, now U.S. Pat. No. 9,283,887, issued Mar. 15, 2016, which claims the benefit of U.S. Provisional Patent Application No. 61/832,494 filed Jun. 7, 2013, and also claims priority to Provisional Patent Application No. 61/968,028, filed Mar. 20, 2014, all of which are incorporated by reference in their entirety.

FIELD OF THE INVENTION

This invention generally relates to a vehicle control system and accessories with a simple connection providing power and data input.

BACKGROUND

One of the primary functions of a vehicle's signaling system is to draw the attention of other motorists and pedestrians, effectively warning them of the presence of the vehicle. Accomplishing this function provides safety to the vehicle, other motorists, and pedestrians. Integrated wiring harnesses and control systems have been used for vehicle signaling. Some examples of these types of control systems are disclosed in U.S. Pat. Nos. 5,422,623, 5,703,411, and 5,736,925 functional warning units Bader et al. U.S. Pat. No. 5,422,623 discloses a signaling system for a vehicle that includes one or more signaling devices such as a light located on a lightbar and a housing to enclose a first control unit necessary for delivering power to the signaling device. A second control unit remote from the first is electrically coupled to the electronics in the housing and stores and controls the signal patterns for the signaling devices. The control units are connected via a bus. Separate cabling from a battery carries power and reference ground wires to each of the control units.

Bella et al. U.S. Pat. No. 5,703,411 discloses a wiring harness and control system for vehicle functional warning units directed at easy and quick installation into vehicles. A control unit, mounted on the underside of the rear deck of the vehicle, couples to a user-controlled console. Branches of a wiring harness connected to the control unit are routed to the lightbar, the headlights, warning lights and grille light. The control unit contains a load shedder circuit that distributes fused power to the lighting system elements.

Dawson et al. U.S. Pat. No. 5,736,925 discloses a modular lighting control system for vehicle lighting control directed at a vehicle such as an ambulance. A central processor processes commands from a user-controlled interface to route power to each of the signaling devices under the control of the central processor. The signaling devices are modular in that they may be selectively coupled to the central processor for a custom installation where the selective coupling requires a wiring harness to connect each signaling device to the central processor.

Vehicle accessories can include customized devices for specific functions or purpose. The vehicle accessories may be required for certain classes of vehicle or for use in response to specific types of events. For example, a push bumper is attached to a vehicle to protect the vehicle while providing a strong, sturdy bumper capable of pushing other vehicles or objects with vehicular force. This function is necessary in moving disabled vehicles, striking other vehicles or objects, or to clear an object in a situation. Mounting lights or other active visual and audible devices on a push bumper can lead to unorganized or large amounts of connective wiring hanging within the system or undercarriage of the vehicle that can add a significant amount of weight to the vehicle with both added wiring and harnesses.

Setina et al. U.S. Pat. No. 6,113,164 discloses an auxiliary push bumper with mountable front or side lights. One embodiment is an auxiliary bumper apparatus for a police motor vehicle with a pair of side lights for transmitting light beams outwardly from opposite sides of the vehicle. The lights may also be mounted in openings in the center bumper for transmitting light beams from the front of the vehicle. The lights are generally used for improved road illumination.

Tobin et al. U.S. Pat. No. 8,204,245 discloses a vehicle bumper capable of sound projection through the use of a horn comprising a diver, a cone, and a speaker. The bumper comprises a plurality of uprights and at least one generally horizontal member. The bumper further comprises a horn for emitting sound and wiring to connect the bumper device to the vehicle's electric system.

SUMMARY OF THE INVENTION

In one aspect, the invention relates to an vehicle control system including at least one functional warning unit adapted to be mounted to the vehicle, each functional warning unit having an alert device, connector and a remote controller configured to control a desired state of the respective alert device, and wherein the at least one functional warning unit is configured to sense a state of the vehicle and the remote controller is further configured to transmit the sensed state of the vehicle to the central controller, a central controller configured to sense a state of the vehicle and generate a desired state of the functional warning units based at least partially on the sensed state of the vehicle and encode the desired state into an encoded packet, and a functional connection between the central controller and the at least one functional warning unit and configured to transmit the encoded packet from the central controller to each of the at least one functional warning unit. The remote controller is configured to parse the desired state of the respective alert device in the encoded packet and set the state of the respective alert device based on the parsed encoded packet.

DETAILED DESCRIPTION

Figure 1:
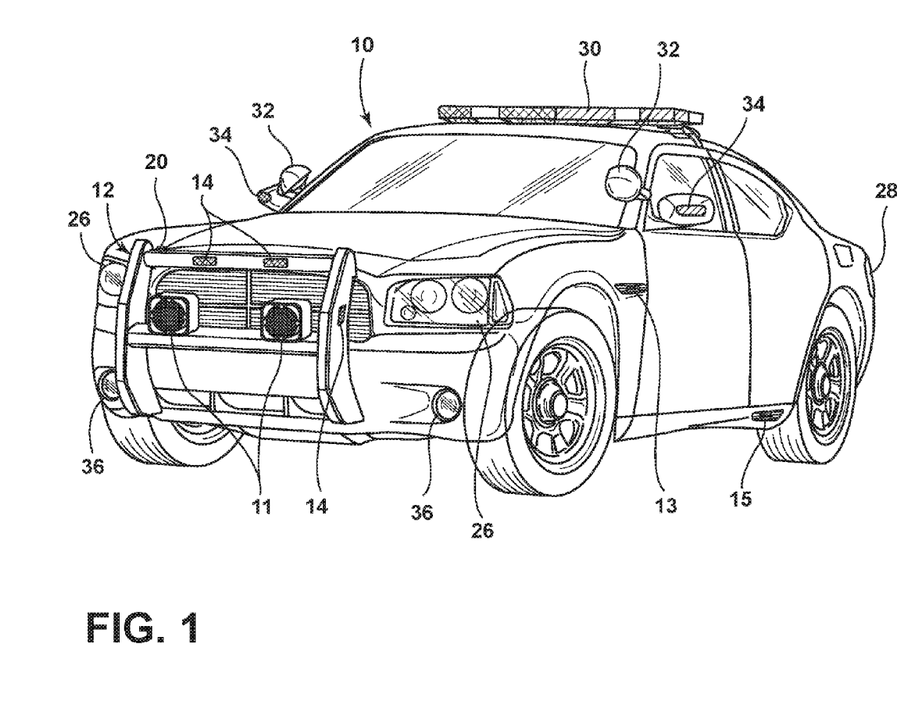
FIG. 1 is a perspective view of an vehicle with vehicle accessories attached thereon.

Referring now to the drawings and to FIG. 1 in particular, a perspective view of an emergency vehicle 10 with a bumper accessory 12 mounted to the front of the vehicle is shown. The emergency vehicle 10 may be any vehicle used for public or private emergency response or action and may be any vehicle type, make, or model. The emergency vehicle 10, in addition to the standard elements of a typical vehicle, may include accessories (referred to equivalently, and without limitation, as "functional warning units") such as a bumper accessory 12, fender light 13, lights 14, running light 15, headlights 26, tail lights 28, a lightbar 30, spotlights 32, side-view-mirror lights 34, fog lights 36, a siren, a horn, speakers 11, strobes, directional lights, or perimeter lights or combinations thereof. The lights 14 may be any device that illuminates, lights up, blinks, flashes, strobes, brightens, or dims. Other functional warning units may be included depending on the particular emergency vehicle 10. While an "emergency vehicle" 10 is described, embodiments of the disclosure can be applied to any vehicles 10, including, but not limited to, land-based, sea-based, or air-based vehicles 10. Non-limiting examples of additional vehicles 10 can include, for instance, cars, trucks, semi-trucks, cargo carriers, boats, aircraft, and trains. Furthermore, as used herein, a vehicle 10 does not need to include an independent propulsion system, and can include, for example, train box cars, barges, trailers, or semi-trailers.

An emergency vehicle 10 should provide active visual and audible warnings to attract the attention of other motorists and pedestrians as the parties may enter the vicinity of one another. The bumper accessory 12 protects the emergency vehicle 10 and operates as a means for applying vehicular force while simultaneously alerting other motorists and pedestrians.

To provide such alerts, a functional warning unit, such as the bumper accessory 12 may include a set of alert devices that provide visual or audible alerts, the set of alert devices include, but are not limited to, lights, lightbars, sirens, horns, speakers, strobes, headlights, taillights, directional lighting, and spotlights. Other active visual and audible alert devices may be integrated into a functional warning unit depending on the specific requirements of the particular emergency vehicle 10. For example, alert devices can include public address systems, air horns, load lights, etc.

A functional warning unit is attachable or mountable to the emergency vehicle 10. For example, the bumper accessory 12 can be attached by bracket assembly or be mechanically fastened directly to the frame or bumper of an emergency vehicle 10. Mechanical fasteners can include, but are not limited to, bolts, clamps, pins, or threaded fasteners such as screws. In other embodiments, a functional warning unit can be mounted on the front, rear, corners, frame, sides, top, or undercarriage of the emergency vehicle 10 or any combination thereof as necessary depending on the particular emergency vehicle 10.

The bumper accessory 12 is easily connectable to the emergency vehicle 10, preferably by a single plug-in connection that includes a serial data wire into the electronic vehicle (EV) system. The single, plug-in connection provides a source of power as well as a data connection (via the serial data wire) for communicating with the bumper accessory 12 and operating the set of active visual and audible alert devices.

Police officers and other emergency vehicle operators can exit the vehicle for tasks such as traffic direction, crowd control, or emergency services while the emergency vehicle 10 remains parked in a particular location. Accordingly, an accessory such as a bumper accessory 12 can be operable from outside of the vehicle 10. For example, an officer can operate, control or otherwise trigger events or features of the bumper accessory 12 by interfacing with controls provided on a handheld wired microphone (not shown) commonly provided in an emergency vehicle. Alternatively, a wireless remote (not shown) dedicated to the operation of the features of the bumper accessory may provide an officer with a wireless controller. It is contemplated that the wireless remote may be a bespoke electronic device or a mobile device such as a cellular phone or tablet provided by way of an application for the control of the operation of the bumper accessory 12. Additionally, the bumper accessory 12 can include an externally mounted switch, antenna, plug or button panel 20 for quick activation from outside of the emergency vehicle 10. In other embodiments, the switch, antenna, plug or button panel 20 can be mounted on or built anywhere into the bumper accessory 12. The switch, antenna, plug or button panel 20 can include an interface for selecting options for different active visual and audible warnings based upon the state of the emergency vehicle 10. For example, one selectable option can exclude audible warnings while another selectable option can increase the rate or intensity of the visual warnings.

Figure 2:
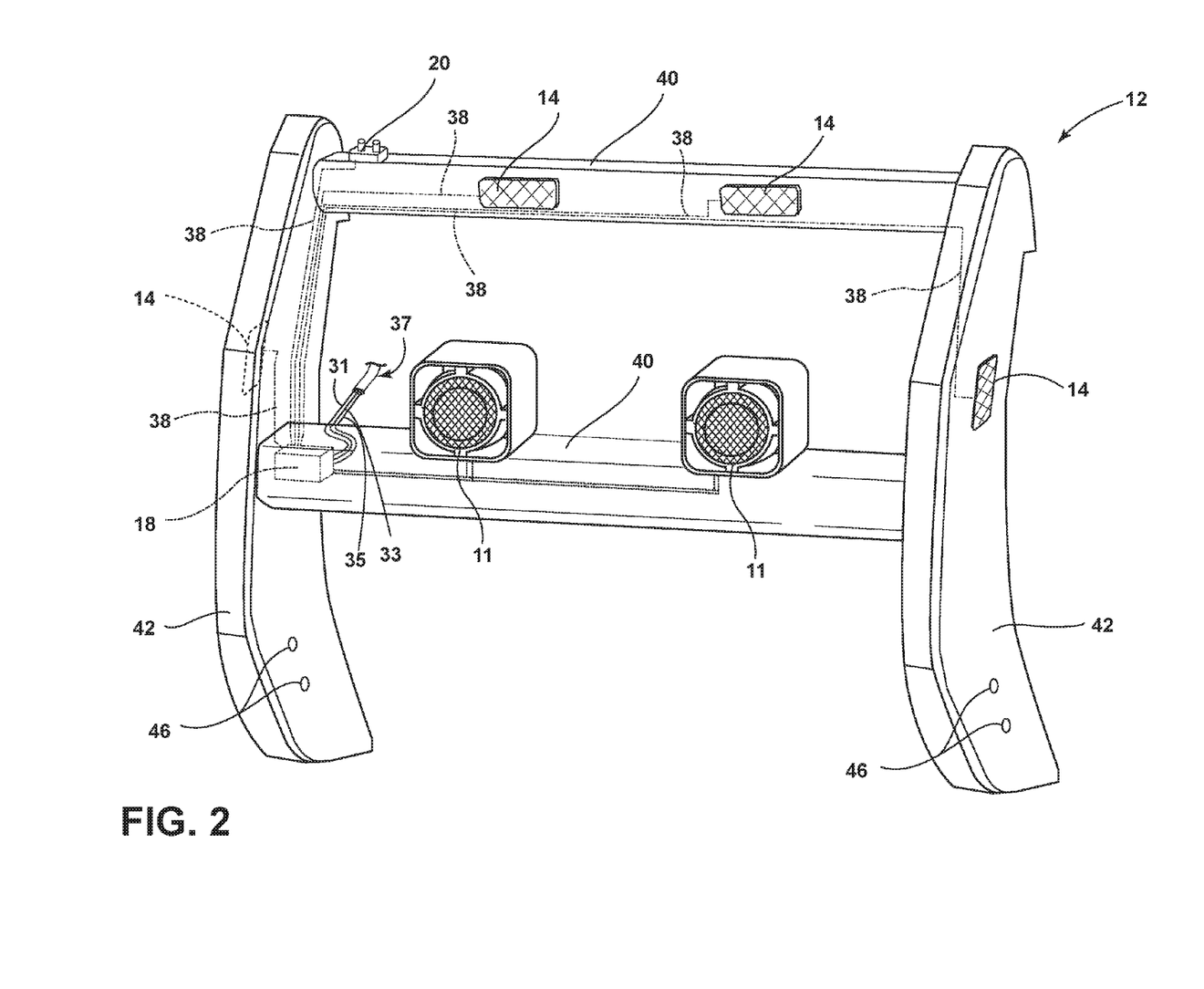
FIG. 2 is a perspective view of a bumper unit showing a system of internal wiring and external connector used for an vehicle accessory.

Referring now to FIG. 2, the bumper accessory 12 is generally composed of one or more vertical members 42 attached to one or more horizontal members 40. The horizontal members 40 and the vertical members 42 are preferably made of strong, yet lightweight material capable of protecting the vehicle while adding minimal weight to the carriage, preferably an aluminum alloy. The bumper accessory 12 may be comprised of any number of horizontal, vertical, diagonal, or curved members or any other type or combination thereof. In a preferred embodiment, two vertical members 42 are connected by two horizontal members 40 fixed between said vertical members 42.

As shown, the upper horizontal member 40 may include the mounted attachment of two lights 14, though other embodiments may include more or less lights depending upon the implementation. Similarly, each vertical member 42 may include lights 14 attached to outer surfaces for transmitting light beams outwardly from opposite sides of the vehicle. Each horizontal member 40, vertical member 42, or any other members comprising a bumper accessory 12 may contain any number of lights 14 or any other active visual or audible device or devices attached to or mounted on any surface of said members.

Active visual and audible alert devices which may be attached to the bumper accessory 12 include, but are not limited to, lights 14, a lightbar, a siren, a horn, speakers 11, strobes, directional lighting, spotlights, or perimeter lighting or combinations thereof. One non-limiting example includes a siren mounted on or within the bumper and connected to the speakers 11. Numerous different bumper accessory embodiments are possible depending on the accessories or active visual or audible devices attached to the bumper accessory 12. The patterns or images generated may change based upon the particular emergency vehicle, its accessories, or the active visual and audible alert devices attached to the bumper accessory 12. The patterns or images may include but are not limited to arrows, symbols, or reverse characters or a revolving, oscillating, strobe, alternating, flashing, modulated, or pulsating light signal as well as any combination thereof.

The horizontal members 40 and vertical members 42 or any members comprising a bumper accessory 12 may be hollow, creating an inner cavity to allow for wiring connections within the bumper accessory 12. In other embodiments, some members may be hollow while others may not. The bumper accessory 12 may contain a system for connecting additional members, extending the area of protection covered by the bumper accessory 12.

A switch, antenna, plug, or button panel 20 is shown attached to the top of a horizontal member for operation outside of the emergency vehicle 10 though the element may include one or more externally mounted switches, antennas, plugs or button panels 20. The bumper accessory 12 may contain a mounting system 46 for attaching a bracket assembly to mount to a vehicle.

An internal wiring system 38 is shown connecting each light 14 to an accessory control unit 18. The internal wiring system 38 may consist of a wire system that may include three wired connections: a power input 31, a ground wire 33, and a network connection wire 35, preferably enclosed in a connection cable 37 for an organized system of wiring. Other wiring configurations are contemplated depending upon the implementation. For example, while shown with a single-ended signaling system for the network connection wire 35, the network connection may include two wires for differential signaling. Other signaling schemes and power distribution systems may be implemented that require more or less wires without loss of generality.

The accessory control unit 18 is a remote controller for connecting the active visual and audible devices on a functional warning unit such as the bumper accessory 12 to, preferably, an EV system. The accessory control unit 18 is responsible for receiving, interpreting, and sending data messages within a network of the emergency vehicle 10. The accessory control unit 18 uses those data messages to set the state of the active visual and audible devices mounted on the bumper accessory 12. The state may include on or off designations, flash designations resulting in specific patterns, or any other designation. Depending on the active visual and audible devices installed, numerous different states, patterns, and designations are possible. The accessory control unit 18 can receive inputs from switches 20 or other sensors configured to sense the state of the vehicle and transmit data messages representative of the inputs back to a central controller located on the vehicle The active visual and audible devices connect by internal wiring system 38, to an EV system of the emergency vehicle, through the accessory control unit by a set of wires that may include three or four wires as described above. As shown, a power input wire 31, a ground wire 33, and a network connection wire 35 may comprise the connection cable 37. The connection cable 37, enables a single, "plug and play" connection to install the bumper accessory 12 into the emergency vehicle's power distribution and network system, referred to herein as the EV system. The connection can be made at a central control head located proximate the accessory installed into the EV system to allow for a single, plug-in connection from multiple emergency vehicle accessories or remote control devices.

Figure 3:
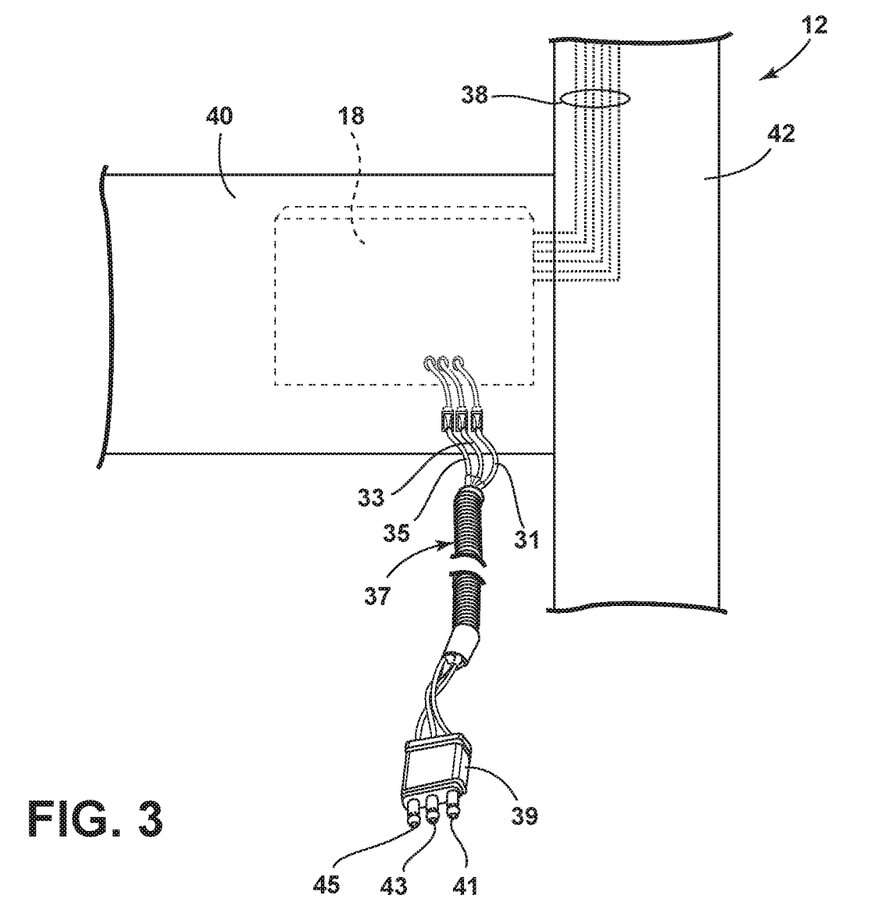
FIG. 3 is an enlarged view from behind the bumper of FIG. 2 with a 3-wire connection leaving the vehicle accessory.

Referring now to FIG. 3, an exploded view of a horizontal member 40 and vertical member 42 connection from behind the bumper accessory 12 is shown.

The accessory control unit 18 is installed in a hollow horizontal member 40 and the internal wiring system 38 is shown running through a hollow vertical member 42 connecting to the accessory control unit 18. In another embodiment, each set of wires in the internal wiring system 38, connecting to an individual active visual or audible device, may be enclosed by a connection cable 37 as shown outside of the bumper accessory 12. The accessory control unit 18 may be securely mounted to the outside of the bumper accessory 12 or be installed in any hollow area within the bumper accessory 12.

The bumper accessory 12 may be mounted on an emergency vehicle 10 and the power and control wires may be plugged into the vehicle's EV system with a single connection, enabling an operator of an emergency vehicle 10 to have control over the operation of the bumper accessory 12 as soon as the plug-in connection is made. Alternatively, the wires may be directly hardwired to the system without a plug. In this way, the electronics for a bumper accessory 12 is a modular unit that may be installed via a single connection cable 37 or at a single access point. For example, as shown in FIG. 3, the accessory control unit 18 may have three wires leaving the unit for connection into a vehicle's EV system. The power input wire 31, ground wire 33, and network connection wire 35 are contained within a connection cable 37 for protection and organization of the wiring system. The connection cable 37 ends at a connection cable head 39. The connection cable head 39 may contain three male plugs 41, 43, 45, allowing a single plug-in unit to connect all three wires to the EV system within the emergency vehicle 10. As shown, the power input plug 41 may allow for the power input wire 31 to connect to the vehicle's EV system. The ground wire 33 connects via the power output plug 43, and the network connection wire 35 connects via the network connection plug 45.

The connection cable 37 may be made of any flexible, water resistant, and tough material. The flexibility would allow the connection cable 37 to wind around parts of an emergency vehicle 10 to connect to the EV system. The material may be a rubber, plastic, metal, or any other material capable of protecting the internal wires from the harsh environment existent in, around, or under an emergency vehicle 10. The connection cable 37 should be able to resist the elements of weather including rain, flood, snow, ice, or cold and the elements of an emergency vehicle's system including heat. The material should be tough enough to be protected against elements of the road including rocks, salt, metal, or gravel that may strike the connection cable 37. The connection cable 37 may be of any length necessary to connect the bumper accessory 12 to the vehicle's EV and network system depending on the particular emergency vehicle 10.

While shown with a three-head, male-prong coupling system, the connection cable head 39 may use any type of electrical coupling system used for securing electrical connections. For example, the coupling system may include a female coupling head attached at the end of the connection cable 37 for accepting three or four prongs at an EV and network connection socket. In other embodiments, both an EV and network controller and the bumper accessory 12 may have hardwired connections without a plug-in connector.

Figure 4:
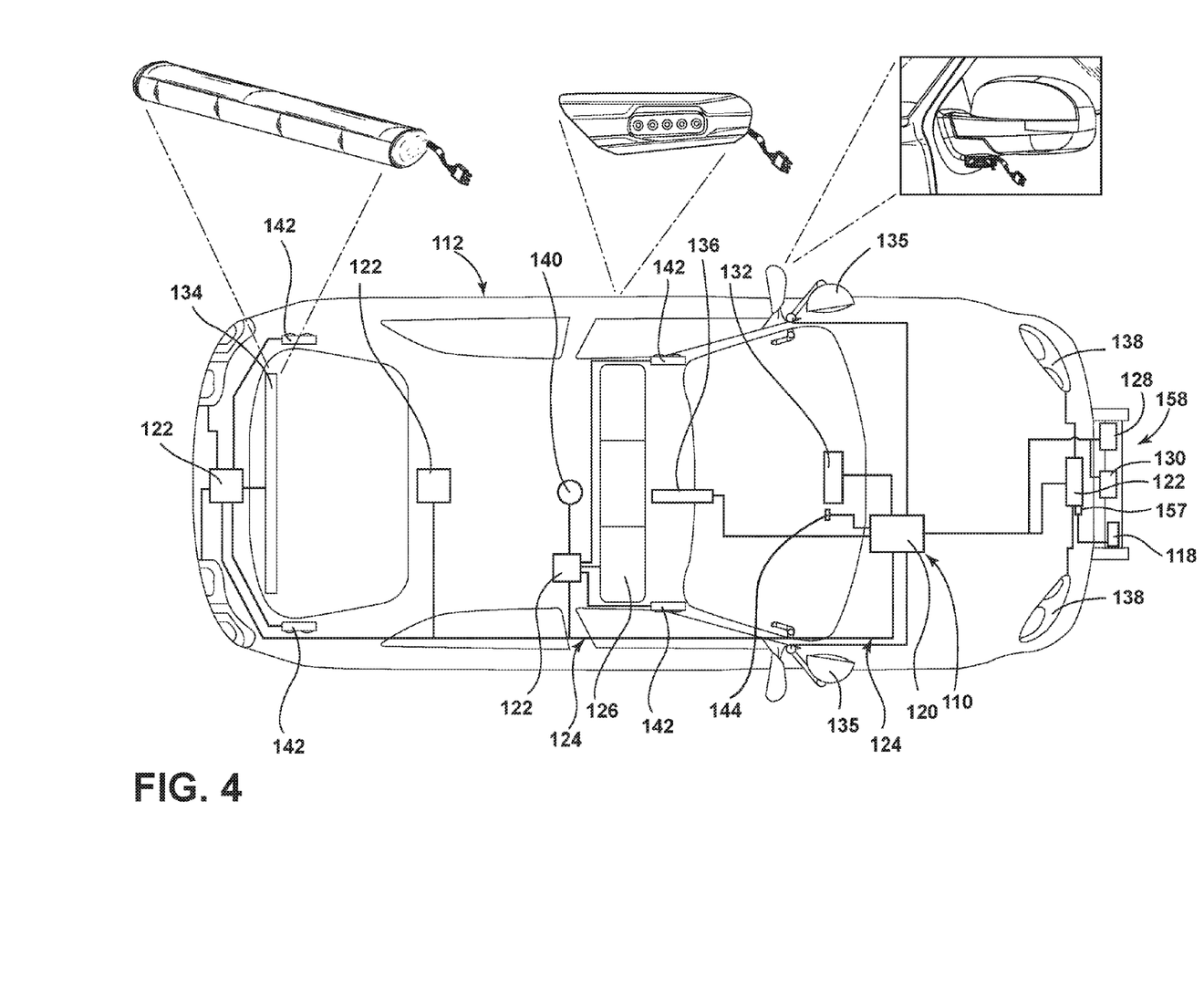
FIG. 4 is a top, transparent view of an vehicle showing the vehicle accessories electrically connected to a modular networked control system.

FIG. 4 is a top, transparent view of an emergency vehicle showing the emergency vehicle accessories electrically connected to a modular networked control system. All of the emergency vehicle lights and other emergency vehicle functional warning units may be connected to a modular networked control system 110 and controlled in part by a user-interface on a control panel 132, preferably located at or near the console of the emergency vehicle 112. Alternatively, the control panel 132 may be implemented by a smart phone or tablet—either wired or wirelessly. Any device capable of providing a human-machine interface (HMI) may be used as the control panel 132 depending upon the particular implementation. Other devices for providing HMI may include a purpose-built touch panel device specifically for emergency vehicles or a multi-button console control head.

Other inputs relating an aspect of the state of the vehicle are not related to a dedicated user interface. For example, discrete inputs include, but are not limited to, the brake pedal, the state of the transmission such as reverse or park, turn signals, bright light indicators, the state of the door, such as in an open or close state, the state of the hatch, such as in an open or close state, the vehicle speed, engine data, etc. It is contemplated that each remote controller including the accessory control unit may be implemented and may include one or more inputs, one or more outputs or combinations thereof. For example, the remote controller may include, but not be limited to, 20 inputs. The remote controller can include an electronics housing commensurate with the operating environment in which it is located. For example, the remote controller may include a sealed housing though in other implementations, no electronics housing is used.

To control and coordinate the emergency vehicle accessories, a modular networked control system 110 further may be integrated into the emergency vehicle 112. A modular networked control system 110 may further include a central controller 120 communicatively coupled to one or more remote controllers 122 via a network connection. As shown in FIG. 4, the network connection may preferably be a Local Interconnect Network (LIN) 124. Other networks may be implemented, for example, a Controller Area Network (CAN) or a wireless local area network (WLAN).

The LIN 124 is a broadcast serial network connecting a single master node with one or more slave nodes. All messages on the LIN 124 are initiated by the master node with a single slave node or multiple slave nodes replying to a given transmitted message. Communications across the LIN 124 may be carried at a 19.2 kbits/s data rate though other data rates may be implemented. The master and slave nodes are typically implemented as a microcontroller but may alternatively be implemented as application-specific integrated circuits (ASICs).

Integrated into the central controller 120, the master node of the LIN 124 initiates communications with the slave nodes that are integrated into each remote controller 122. The network topology, or organizational hierarchy of the interconnected nodes on the LIN 124, may be any network that enables communications between the central controller 120 and the remote controllers 122. In one implementation, the network topology is a star network where all the slave nodes in the remote controllers 122 are directly connected to the master node in the central controller 120. However, other network topologies such as a tree topology may be implemented to allow for remote controllers 122 to be daisy-chained such that some of the slave nodes of the remote controllers 122 are communicatively coupled to the central controller 120 through the slave nodes of other remote controllers 122.

The emergency vehicle functional warning units controlled by the modular networked control system 110 may be connected to the outputs of either the central controller 120 or any of the remote controllers 122. Functional warning units such as the lightbar 126, siren 128 and horn 130 may preferably be directly connected to the central controller 120 whereas the directional light 134 or the headlight flashers 138 may be directly connected to one of the remote controllers 122. The interoperability provided by the modular networked control system 110 enables emergency vehicle functional warning units to be connected to the controller deemed most accessible. This system enables short cable lengths to the controlled emergency vehicle functional warning units to boost drive intensity, simplify and speed installation, and reduce harness weight and cost.

The emergency vehicle functional warning units operably controlled by the modular networked control system 110 may not be limited to visual and audible warning devices. For example, a gun rack 136 may be selectively locked and unlocked by a solenoid connected to either the central controller 120 or a remote controller 122. Any 12-volt accessory socket 144 or device may be operably controlled in the same manner; energized or de-energized according to an output of either the central controller 120 or a remote controller 122.

Regardless of the particular network topology of the LIN 124, the configuration of the central controller 120 and the remote controllers 122 on the LIN 124 asserts a modular design whereby additional remote controllers 122 may be plugged into the network without reconfiguration of previously installed elements of the networked system, particularly the central controller 120. Installation of additional remote controllers 122 requires a single power connection to be run from a power source to the additional remote controller 122. Additional emergency vehicle functional warning units may be connected to the additional remote controller 122 without an additional wiring harness being run back to the central controller 124. In one aspect of the invention, the ready addition of new remote controllers 122 and the ability to plug into the networked system provides for a highly scalable implementation.

The bumper accessory 158 mounted to the emergency vehicle 112 contains an accessory control unit 118 which is a remote controller integrated into a functional warning unit. In addition to the bumper accessory 158, spotlights 135, a siren 130, a speaker 128, and headlights 138 are accessories shown connected to a modular networked control system 110. In other embodiments, accessories other than or in addition to the accessories shown may connect to the modular networked control system 110. All connections are power connections in the EV system and network connections to the modular networked control system 110.

The modular networked control system 110 is connected to a vehicle power source such as the car battery, alternator, generator, or EV system. A connection to the vehicle power source, in the preferred embodiment, is made at a central controller 120 by a +12 Vdc connection and a chassis ground connection. In other embodiments, a connection to the vehicle power source may occur at other parts of the modular networked control system 110 and may include multiple, separate power connections.

The modular networked control system 110 is formed by a series of connections, controllers, and control units and enables the control and coordination of the active visual and audible devices and the bumper accessory 158 as well as any other accessories on the emergency vehicle 112. In a preferred embodiment, the modular networked control system 110 includes a control panel 132, a central controller 120, optionally one or more additional remote controllers 122, and an accessory control unit 118. Other embodiments may include any number or combination of control panels 154, central controllers 150, remote controllers 152, control units, emergency vehicle accessories including the bumper accessory 158, or active visual or audible devices or lack thereof.

The modular networked control system 110 is interconnected by electrical connections that generally enable "plug-and-play" accessibility. The connections may include a single plug-in connection but a direct hardwired connection may be implemented in making connections between the different network devices. Accessories such as the spotlights 135 may preferably be directly connected to the central controller 120 whereas the headlights 138 or the bumper accessory 158 may be directly connected to one of the remote controllers 122. The interoperability provided by the modular networked control system 110 enables emergency vehicle accessory devices to be connected to the controller deemed most accessible. The central controller 110 and each remote controller 122 will preferably contain at least ten connection sockets for installing multiple emergency vehicle accessories or additional controllers, but may contain any number or type of connections in other embodiments.

The bumper accessory 158 contains an accessory control unit 118. With reference to both FIGS. 3 and 4, the accessory control unit 118 is connected by a power input wire 31, a ground wire 33, and a network connection wire 35 contained within a connection cable 137. The connection cable 137 is coupled to the central controller 120. The connection provides power and a network interface allowing for immediate control and operation of the bumper accessory 158. Alternatively or in addition to the direct connection to the central controller 120, the connection cable 137 may be coupled to a remote controller 122 via a connection socket 157. At the connection socket 157, the connection cable head 39 may be plugged into the remote controller 122 giving the bumper accessory 158 an instant connection to the EV system and the modular networked control system 110.

The modular networked control system 110 is controlled by a human-machine interface at a control panel 132 located preferably on or near the console of the emergency vehicle 112, but may be located remotely. The human-machine interface at the control panel 132 may be implemented in a mobile device such as a smart phone or tablet either wired or wirelessly. Other devices for providing human-machine interface may include a purpose-built touch-panel device specifically for emergency vehicles or a multi-button console control-head.

The modular networked control system 110 is interconnected by network connections preferably over the network described above as preferably a LIN. The LIN allows the central controller 120 to initiate communication with a remote controller 122 according to a communications protocol defining the format and syntax of the data message as well as data exchange rules between network nodes. One aspect of the modular networked control system 110 is that the central controller 120 can be communicatively coupled to multiple remote controllers such as remote controller 122 and accessory control unit 118 by a common bus line. In this way, the common bus line for the accessory control unit 118 may be directly coupled to the central controller 120 or may pass through the remote controller 122.

The modular networked control system 110 may operate using a broadcast serial network connecting a single master node with one or more slave nodes. The master node may initiate the communications on the network or external elements in communicatively coupled to the network may initiate the communications. For example, a siren 130 actuated to deliver an audible signal may initiate network communications that may result in the actuation or triggering of features or events on the bumper accessory 158. All messages on the network are initiated by the master node or a slave node with a single node or multiple nodes replying to a given transmitted data message. The master node is preferably integrated into the central controller 120 which initiates communications with a slave node integrated into the accessory control unit 118. In other embodiments, the master node may be located in a different controller such as the control panel 132, and other slave nodes may be integrated into remote controllers 122 or other emergency vehicle accessories.

The network topology may be any network that enables communications between the central controller 120 and the accessory control unit 118. In a preferred embodiment, the connections may operate as a bus network from the control panel 132 to the active visual and audible devices. In one embodiment, the network topology may be a star network topology where the bumper accessory 158 and other accessories are directly connected to the master node in the central controller 120. Another example is a tree network topology to allow for remote controllers 122 or accessories, including the bumper accessory 158, to be daisy-chained together, such that some of the remote controllers 122 or accessories are communicatively coupled to the central controller 120 through other remote controllers 122 or accessories.

In a preferred embodiment, the bumper accessory 158 may contain a single connection capable of being plugged into the modular networked control system 110. For example, a central controller 120 may contain a number of connective ports allowing for the bumper accessory 158 or other accessories to directly couple and communicate with the central controller 120. Upon making the connection, the bumper accessory 158 is immediately powered and operable as part of the modular networked control system 110.

Figure 5:
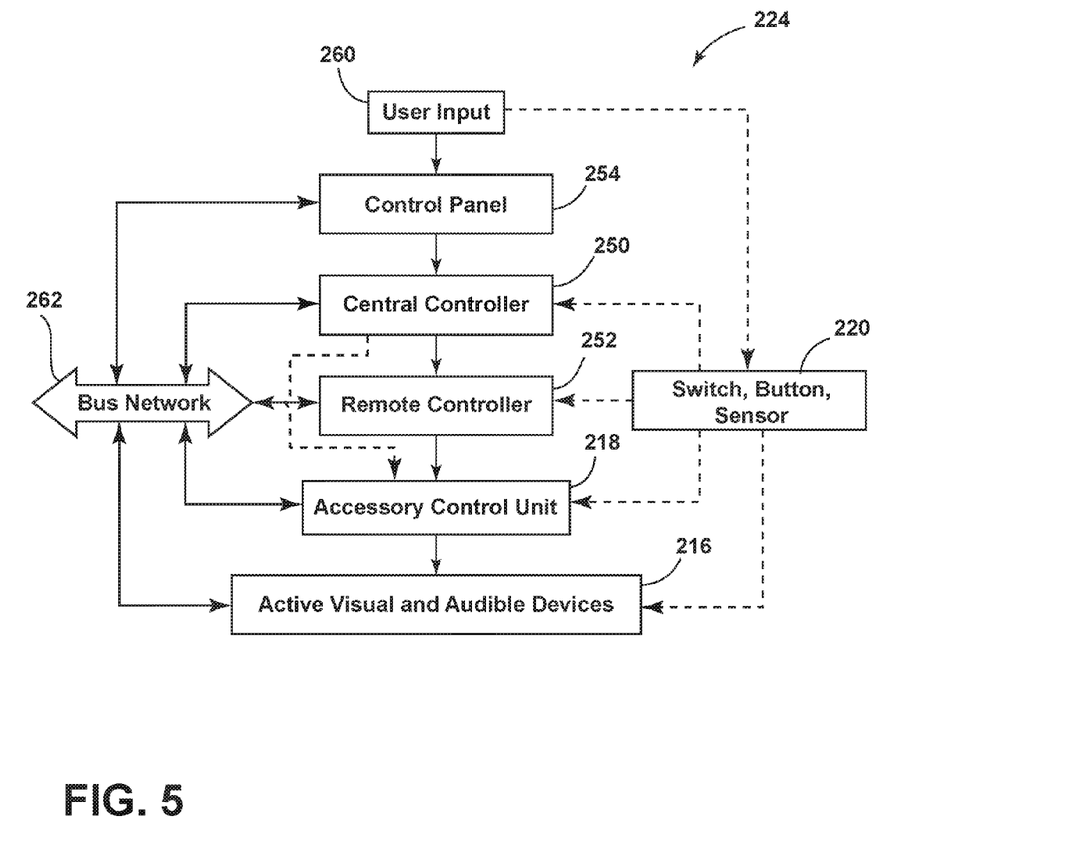
FIG. 5 is a schematic representation of the modular networked control system in communication with an vehicle accessory.

Referring now to FIG. 5, a schematic view of the modular networked control system 224 is shown. In a preferred embodiment, a modular networked control system 224 contains network parts comprising user input 260, a control panel 254, a central controller 250, an accessory control unit 218, and active visual and audible devices 216 operable across a bus network 262. Each network element is communicatively coupled to its following network part respectively.

Other embodiments may include additional network parts or exclude certain network parts based upon the particular emergency vehicle. The modular networked control system 224 is connected as a bus network 262 or other network topology. Any combination of some, all, multiple, or additional network parts may embody the modular networked control system 224.

The operator of the emergency vehicle, or a passenger, preferably enters the user input 260 through a control panel 254 located within the vehicle. The control panel 254 is any device capable of receiving user input 260 by human-machine interface and is communicatively connected to the modular networked control system 224. In another embodiment, user input 260 may be entered at a remote location where the control panel 254 and modular networked control system 224 have wireless capabilities.

The data message sent from the control panel 254 determined by user input 260 is sent to the central controller 250. The central controller 250 then creates the state of the active visual and audible devices 216 located on the accessory. The state created is sent in a data message to a remote controller 252 if one is implemented into the modular networked control system 224, or may reach the accessory control unit 218 if connected directly to a central controller 50 over the bus network 62. In one preferred implementation, a remote controller 252 is not integrated into the system such that the central controller 250 is directly coupled to the accessory control unit 218 by at least a single serial data wire.

Regardless of the embodiment or network topology of the modular networked control system 224, the data message containing the state of the active visual and audible devices 216 will be received by the accessory control unit 218 through the network connection via a connection cable. The accessory control unit 218 interprets the data message and instructs the active visual and audible devices 216 to operate according to the state of the emergency vehicle as determined at a central controller 250.

User input 260 may operate an externally mounted switch, antenna, plug or button panel 220 physically attached to the accessory outside of the emergency vehicle. The activation of the an externally mounted switch, antenna, plug or button panel 220 may instruct the accessory control unit 218 to begin operating the active visual and audible devices 216. In another embodiment an externally mounted switch, antenna, plug, button panel, or discrete vehicle state sensing device 220 may operate the active visual and audible devices 216 directly and may determine the state at which they operate. In another embodiment, the externally mounted switch includes a sensor for sensing a state of the vehicle or its environment and automatically communicating the state via the accessory control unit to the central controller. For example, an accelerometer positioned on the bumper accessory may sense a collision, whereby the central controller may set a desired state of the vehicle's visual and audible devices in response to the emergency event.

Figure 6:
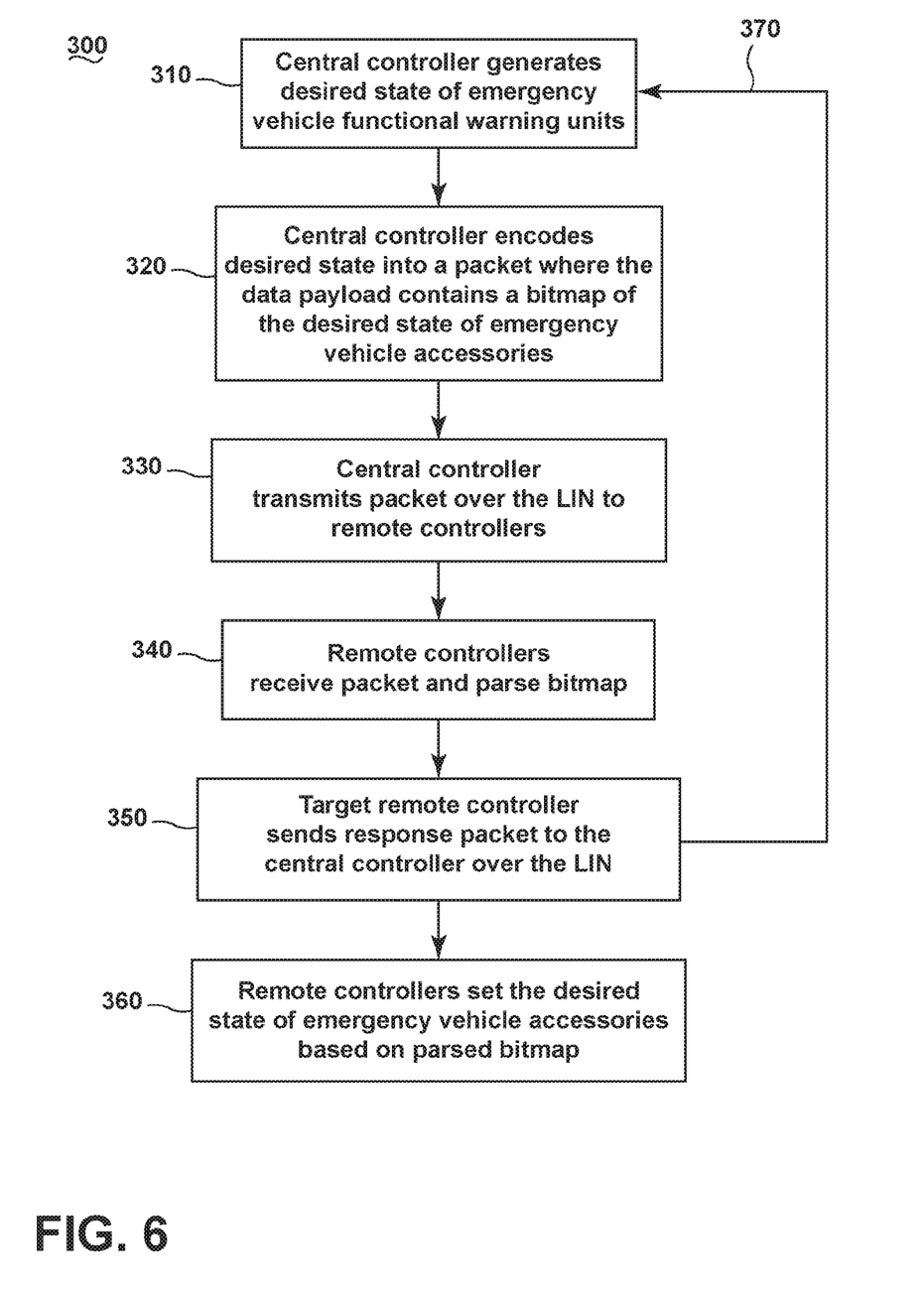
FIG. 6 is a flowchart showing communication between a central controller and remote controllers for setting the state of the vehicle accessories.

Referring now to FIG. 6, the method of communicating the desired state of the emergency vehicle functional warning units 300 from the central controller to the remote controllers by the communication protocol according to the present invention will now be described. At the start of each data frame at step 310, the central controller may generate the desired state of the emergency vehicle functional warning units connected to the central controller by way of the LIN. The central controller may then encode at step 320 the desired state of the emergency vehicle functional warning units; that is, ON/OFF or powered/not powered, or as a pulse-width modulated signal, into the data payload of the packet as will be described below. The encoding of the desired state may be a bitmapped representation where each emergency vehicle functional warning unit's state will be assigned a 0 or 1. Then at step 330, the central controller may transmit the packet over the LIN to the remote controllers. At step 340, each of the remote controllers may receive the packet and, generally, parse the packet and, more particularly, parse the bitmap representation of the desired state of the emergency vehicle functional warning units under the control of the remote controller. A target remote controller may generate and send a response packet including an acknowledgement to the central controller over the LIN at step 350. Then, at step 360, the remote controllers may set the current state of the emergency vehicle functional warning units based on the desired state encoded in the parsed bitmap. At 370, the response packet may be sent from the target remote controller and received by the central controller designating the completion of the current data frame and the beginning of the next data frame where the process may be repeated.

Each data packet formed according to the communications protocol may consist of a first byte that encodes the length of the packet in bytes, a second byte that encodes the target of the packet and the type of data encoded in the payload. The next sequence of bytes may encode the payload or actual data encoded in the packet. The last two bytes of the packet may encode a cyclic redundancy check (CRC). The CRC is a well-known error-detecting code used in digital networks to detect accidental changes to raw data and need not be described in more detail here.

Table 1 presents a tabular description of the structure of first byte of the communications protocol. The first byte may encode the length of the packet in bytes.

TABLE 1

| Packet Length | | | | | | | |
|---|---|---|---|---|---|---|---|
| Bit 7 | Bit 6 | Bit 5 | Bit 4 | Bit 3 | Bit 2 | Bit 1 | Bit 0 |
| Encodes the total number of bytes in the packet | | | | | | | |

Table 2 presents a tabular description of the structure of the second byte of the communications protocol. The target bit may be set to indicate the packet is being sent from the central controller to one of the remote controllers or being sent from one of the remote controllers to the central controller. The module identifier in the final three bits may encode which remote controller is transmitting or being targeted. The type or function of the data encoded in the payload may be described by the three function bits of the packet header.

TABLE 2

| Packet Header | | | | | | | |
|---|---|---|---|---|---|---|---|
| Bit 7 | Bit 6 | Bit 5 | Bit 4 | Bit 3 | Bit 2 | Bit 1 | Bit 0 |
| Target | Function | | | Module Identifier | | | |

Table 3 presents a tabular description of the packet structure of the communications protocol of the present invention. As described above, the packet encodes the length of the packet in bytes, the target and function of the packet, the data payload for the encoded function in a variable number of bytes and the CRC for detecting errors in the transmitted packet.

TABLE 3

| Packet Length | Packet Header | Payload | CRC |
|---|---|---|---|
| 1 byte | 1 byte | Variable bytes | 2 bytes |

One encoded function indicates the data payload is the output enabled state of every emergency vehicle functional warning unit connected to the modular networked signaling system. The data payload maps a single bit representative of a desired ON/OFF state for each emergency vehicle functional warning unit. In this way, a single output packet encodes the desired state of every emergency vehicle functional warning unit connected to the networked signaling system in a bitmap. For a network with five remote controllers where each remote controller is coupled to ten emergency vehicle functional warning units, information for all 50 outputs is encoded in less than seven bytes of data. Further, all of the remote controllers may update the current state of each emergency vehicle functional warning unit based on that data. Therefore, all system outputs may update at approximately the refresh rate of the data frame of the communications protocol. With a preferred implementation, the signaling system may update at approximately a rate of once every 10 ms. However, the refresh rate may ideally be selected to achieve the fastest output update rate and lowest input latency.

As described above, the target remote controller may send a response packet to the central controller over the LIN in the data frame. The response packet may act as an acknowledgment of the data packet sent by the central controller. The data payload of the response packet may encode the current state of additional system inputs that are directly connected to the target remote controller. The state of the additional inputs may be encoded as one of many possible states. For example, an analog voltage level of an additional input may be digitized and encoded into the data payload of the response packet. In this way, the additional inputs connected to each remote controller may be discretized and subject to digital signal processing techniques including, but not limited to, digital filtering. Other processing techniques including the use of programmable thresholds may be used to process the encoded signals indicative of the state of the additional inputs.

Additionally, the data payload of the response packet may encode faults detected on any of the emergency vehicle functional warning units directly connected to the target remote controller. Other ancillary data may be transmitted back to the central controller in the data payload of the response packet. For example, the temperature of the remote controller may be sensed and then encoded into the data payload of the response packet. Any number of operational characteristics of the remote controllers, the emergency vehicle functional warning units or even the emergency vehicle may be sensed and then encoded into the data payload of the response packet.

By bitmap encoding the desired state of every emergency vehicle functional warning unit on the modular networked control system, the central controller may synchronize all of the devices, particularly the visual and audible warning devices such as the lightbar, siren and perimeter lighting to establish any coordinated signaling pattern desired or required for the particular emergency vehicle. In this way, flash patterns for each lighting device may be encoded into the central controller and may be easily reconfigurable. New patterns may be uploaded into the central controller to adapt to flashing pattern requirements that may differ across regions.

Figure 7:
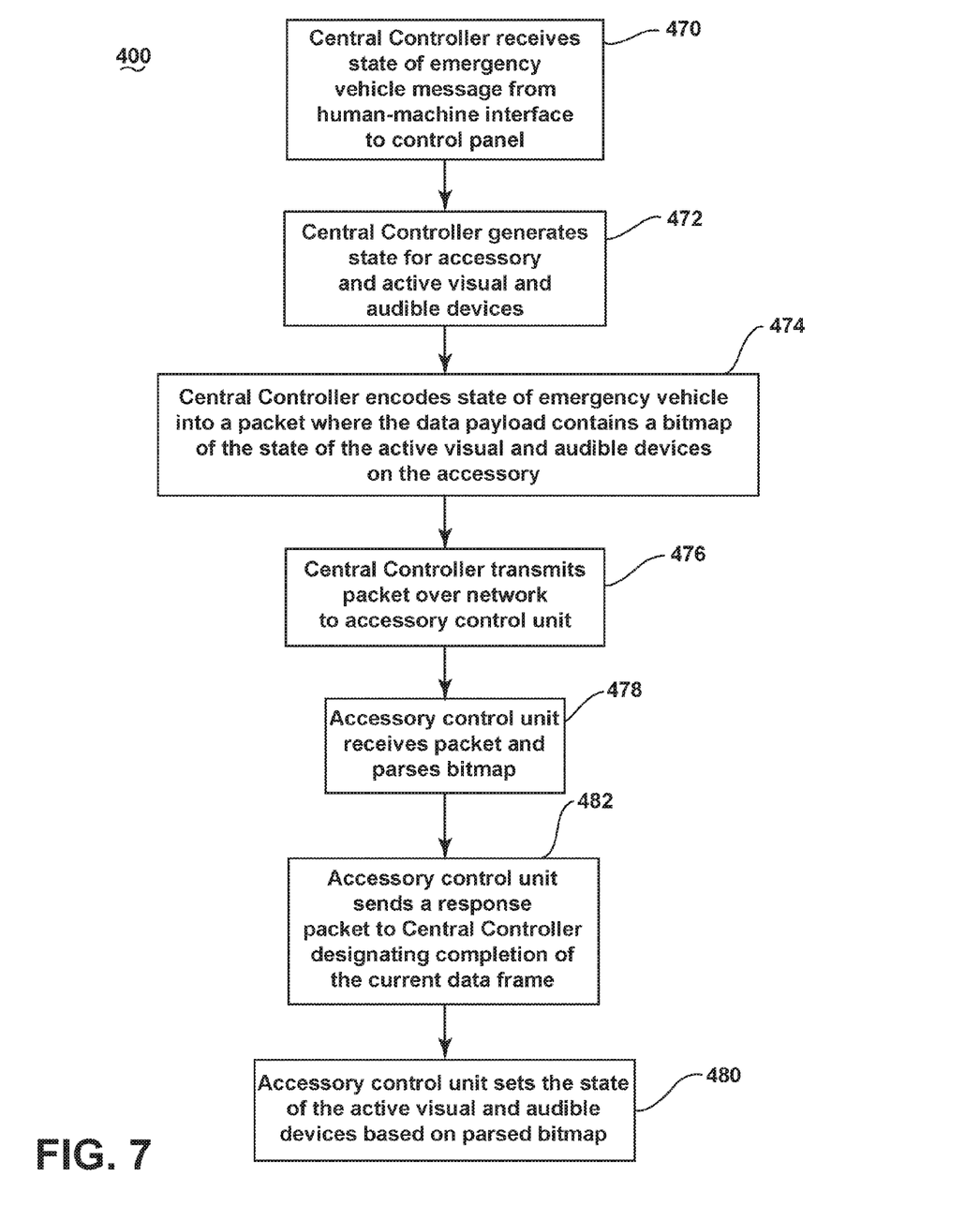
FIG. 7 is a flowchart showing the network communication system between the central controller and the accessory control unit according to an embodiment of the invention.

Referring now to FIG. 7, a method 400 of communicating the state of the emergency vehicle from a central controller to the accessory control unit by the communication protocol according to the present invention will now be described. At step 470, input through human-machine interface or other input source at a control panel determines the state of the emergency vehicle. The control panel sends a data message to the central controller with the designated state of the emergency vehicle. The central controller receives the data message.

At step 472, the central controller generates the state of the accessory and the active visual and audible devices on the accessory based upon the user designated state of the emergency vehicle. At step 474, the central controller encodes the state of the accessory and the active visual and audible devices into the data payload of a packet. The encoded state in the packet may be a bitmap representation of the instructions each active visual and audible device is assigned.

At step 476, the central controller transmits the packet over the network to the accessory control unit. The network may include sending the packet through remote controllers or other control units depending on the network topology of the modular networked control system.

At step 478, the accessory control unit receives the packet and parses the data representation. At step 482, a response packet may be sent from the accessory control unit to the central controller designating the completion of the current data frame and the beginning of the next data frame. At step 480, the accessory control unit sets the state of the active visual and audible devices based on the state of the emergency vehicle encoded in the parsed bitmap.

Other embodiments are dependent upon the network parts in the particular modular networked control system or the network topology implemented in the emergency vehicle. A packet containing a data payload may be transferred among a number of network parts, until the network part governing active visual and audible devices is reached. When the particular governing network part is reached, it receives the packet and parses the data representing the state of the active visual or audible devices. The data may be encoded in one or more of many formats used for packetized digital data transmission. For example, the data structure may include bitmap encoding, dedicated byte values or encrypted data that encodes the message therein. The data-receiving network part may also be responsible for sending a response packet in step 482 over the network to an originating network part.

This invention is beneficial because it enables owners and operators of emergency vehicles to install one or more accessories with a simple connection to an EV system and modular networked control system. Installation is hastened while wiring and harness weight is reduced. Whereas common accessory devices each require their own set of one or more wiring harnesses for each alert device integrated into the accessory, each functional warning unit as described above that includes more than one audible or visual alert device reduces the necessary wiring by a one-to-many relationship. That is, the functional warning unit is connected to the networked system by way of, for example, a single networked data line or a data line and power lines. A functional connection is provided between each alert device on the functional warning unit and the remote controller instead of from each alert device to a controller located remotely from the accessory.

Control of the accessory is simplified by the "plug-and-play" operation style of the modular networked control system. That is, the functional warning units need only to be connected to the networked control system in order to be configured to work on said system.

Throughout this application, a functional warning unit is often described by way of an example accessory in the form of a bumper unit attached to a police cruiser. Those having skill in the art will appreciate that there are various functional warning units attachable to various vehicles by which the functional warning units provide the visual and audible alerts described herein. Hence, functional warning units to provide such alerts can include alert devices such as, but not limited to lights, lightbars, sirens, horns, speakers, strobes, headlights, taillights, directional lighting, spotlights, etc. Other active visual and audible alert devices may be implemented depending on the specific requirements of the particular emergency vehicle can include public address systems, air horns and load lights. While described above in the context of an emergency vehicle such as a police cruiser, ambulance, fire truck etc., embodiments of the invention are applicable without limitation to other vehicles including, but not limited to, construction equipment including dump trucks and cement mixers, tractor-trailers, waste collection vehicles, fleet maintenance vehicles, etc.

Additionally, it is contemplated that the functional warning units may also include devices with auxiliary functionality. That is, functional warning units may include auxiliary devices that sense or respond to their environment, state of the vehicle and user inputs to perform tasks that are not limited to audible and visual alerts. For example, a fleet maintenance vehicle equipped with a modular networked control system as described above can include a functional warning unit in the form of a locker for storage of tools whereby the function of the locker is to present tools to operators of the vehicle. The locker may include an auxiliary device that may include a load sensor or accelerometer to detect when an operator is in a seat of the vehicle. By coupling to the vehicle control system, the locker includes feedback relating the state of the vehicle (i.e. the presence or absence of an operator of the vehicle) and can lock or unlock the locker based on the sensed state.

In another example, a waste collection vehicle equipped with a modular networked control system as described above may include a functional warning unit in the form of a claw for picking up waste bins. The claw may include an auxiliary device that may include a sensor to detect when a waste bin is properly aligned with the claw. By coupling to the vehicle control system, the claw includes a feedback to the central controller relating to the presence of the waste bin and in response to the sensed presence, the claw may engage and actuate to empty the waste bin's contents into the waste collection vehicle.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention. It will be understood that "a set" can include any number of the respectively described elements, including only one element.

What is claimed is:

1. A vehicle control system comprising:
    at least one functional warning unit adapted to be mounted to the vehicle, each functional warning unit having an alert device, connector and a remote controller configured to control a desired state of the respective alert device, and wherein the at least one functional warning unit is configured to sense a state of the vehicle and the remote controller is further configured to transmit the sensed state of the vehicle to a central controller;
    the central controller configured to generate a desired state of the functional warning units based at least partially on the sensed state of the vehicle and encode the desired state into an encoded packet; and
    a functional connection between the central controller and the at least one functional warning unit and configured to transmit the encoded packet from the central controller to each of the at least one functional warning unit;
    wherein the remote controller is configured to parse the desired state of the respective alert device in the encoded packet and set the state of the respective alert device based on the parsed encoded packet.

2. The vehicle control system of claim 1 wherein the functional warning unit includes at least one of a user input device.

3. The vehicle control system of claim 2 wherein the at least one user input device includes an interface configured to receive a user selection.

4. The vehicle control system of claim 3 wherein the interface is configured for selecting a different operation of the at least one functional warning unit.

5. The vehicle control system of claim 4 wherein the interface is configured for selecting at least one of the following operations of the at least one functional warning unit: a visual warning, an audible warning, a rate of warning, a pattern of warning, a warning sequence, or an intensity of warning.

6. The vehicle control system of claim 2 wherein the at least one user input device includes at least one of a switch, an antenna, a plug, or a button panel.

7. The vehicle control system of claim 1 wherein the at least one functional warning unit includes at least one sensor configured to sense the state of the vehicle.

8. The vehicle control system of claim 7 wherein the at least one sensor includes an accelerometer.

9. The vehicle control system of claim 7 wherein the at least one sensor is configured to sense the presence of a vehicle operator.

10. The vehicle control system of claim 7 wherein the at least one sensor is configured to sense the state of at least one of the brake pedal or acceleration pedal.

11. The vehicle control system of claim 7 wherein the at least one sensor is configured to sense the state of the vehicle transmission.

12. The vehicle control system of claim 7 wherein the at least one sensor is configured to sense the state of at least one of the vehicle lights.

13. The vehicle control system of claim 12 wherein the at least one sensor is configured to sense the state of at least one of the turn signal indicators or the bright light indicators.

14. The vehicle control system of claim 7 wherein the at least one sensor is configured to sense the state of a vehicle door.

15. The vehicle control system of claim 7 wherein the at least one sensor is configured to sense the state of the vehicle hatch.

16. The vehicle control system of claim 7 wherein the at least one sensor is configured to sense the speed of the vehicle.

17. The vehicle control system of claim 7 wherein the at least one sensor is configured to sense the state of the vehicle based at least in part on a set of engine data.

18. The vehicle control system of claim 1 wherein the functional alert device includes at least one of an audio or visual alert device.

19. The vehicle control system of claim 18 wherein the at least one of an audio or visual alert device includes at least one of a light, a lightbar, a siren, a horn, a speaker, a strobe, a headlight, a taillight, a directional light, a spotlight, a public address system, an air horn or a load light.

20. The vehicle control system of claim 1 wherein the encoded packet includes a visual pattern forming at least one of an arrow, a symbol or a reverse character.

21. A vehicle control system comprising:
    at least one functional warning unit adapted to be mounted to the vehicle, each functional warning unit having an alert device, connector and a remote controller configured to control a desired state of the respective alert device, and wherein the at least one functional warning unit is configured to sense a state of the vehicle and the remote controller is further configured to transmit the sensed state of the vehicle to a central controller;

the central controller configured to generate a desired state of the functional warning units based at least partially on the sensed state of the vehicle and encode the desired state into an encoded packet; and a functional connection between the central controller and the at least one functional warning unit and configured to transmit the encoded packet from the central controller to each of the at least one functional warning unit;

wherein the remote controller is configured to parse the desired state of the respective alert device in the encoded packet and set the state of the respective alert device based on the parsed encoded packet, and wherein the cumulative number of at least one functional connections is greater than cumulative number of connections from the central controller to the remote controller.

* * * * *